(12) United States Patent
Duke et al.

(10) Patent No.: US 11,464,198 B2
(45) Date of Patent: Oct. 11, 2022

(54) MILKING CLUSTER FOR MILKING AN ANIMAL

(71) Applicant: AN UDDER IP COMPANY LTD, Slindon (GB)

(72) Inventors: Thomas Christopher John Duke, Southbourne (GB); James Richard John Duke, Chichester (GB); Richard Angus Fownes Buchanan, Ashford (GB); George Edward James Duke, Chichester (GB)

(73) Assignee: AN UDDER IP COMPANY LTD., Slindon (GB)

( * ) Notice: Subject to any disclaimer, the term of this patent is extended or adjusted under 35 U.S.C. 154(b) by 179 days.

(21) Appl. No.: 16/630,570

(22) PCT Filed: Jul. 10, 2018

(86) PCT No.: PCT/GB2018/051949
§ 371 (c)(1),
(2) Date: Jan. 13, 2020

(87) PCT Pub. No.: WO2019/012263
PCT Pub. Date: Jan. 17, 2019

(65) Prior Publication Data
US 2021/0076632 A1    Mar. 18, 2021

(30) Foreign Application Priority Data
Jul. 14, 2017  (GB) ...................................... 1711385

(51) Int. Cl.
*A01J 5/04*   (2006.01)
*A01J 5/06*   (2006.01)
(Continued)

(52) U.S. Cl.
CPC . *A01J 5/06* (2013.01); *A01J 5/01* (2013.01); *A01J 5/041* (2013.01); *A01J 5/044* (2013.01);
(Continued)

(58) Field of Classification Search
CPC .... A01J 5/01; A01J 5/041; A01J 5/044; A01J 5/16; A01J 7/04; A01J 5/08; A01J 5/007
See application file for complete search history.

(56) References Cited

U.S. PATENT DOCUMENTS 2,702,526 A * 2/1955 Torgerson ............... A01J 5/041
119/14.55
10,123,506 B2 * 11/2018 Bosma .................... A01J 7/022
(Continued)

FOREIGN PATENT DOCUMENTS

CA          3021980 C    * 11/2019  .............. A01J 5/041
DE    202011108965 U1  *  2/2012  ............ A61M 39/16
(Continued)

OTHER PUBLICATIONS

OSHA (https://www.osha.gov/laws-regs/federalregister/2015-05-04, May 2015 (Year: 2015).*
(Continued)

*Primary Examiner* — Peter M Poon
*Assistant Examiner* — Carly W. Lynch
(74) *Attorney, Agent, or Firm* — Alston & Bird LLP

(57) ABSTRACT

There is provided a milking cluster (102) for milking an animal, the milking cluster comprising a plurality of teat cups (1) connected to a clawpiece (106). The clawpiece comprises a plurality of milk inlets that are connected to the plurality of teat cups via respective short milk tubes (11). A milk flow passageway begins at the barrel of the teat cup and ends at the clawbowl of the clawpiece, and a valve system is present within each milk flow passageway. The valve system comprises a first pressure-actuated valve through
(Continued)

which milk flowing along the milk flow passageway must pass.

21 Claims, 5 Drawing Sheets

(51) Int. Cl.
    *A01J 5/01*     (2006.01)
    *A01J 5/16*     (2006.01)
    *A01J 7/04*     (2006.01)
    *A01J 5/08*     (2006.01)

(52) U.S. Cl.
    CPC . *A01J 5/08* (2013.01); *A01J 5/16* (2013.01); *A01J 7/04* (2013.01)

(56) References Cited

U.S. PATENT DOCUMENTS

| | | |
|---|---|---|
| 2009/0165724 A1 | 7/2009 | Mader et al. |
| 2012/0017836 A1* | 1/2012 | Torgerson ............... A01J 7/022 119/14.08 |
| 2012/0097107 A1* | 4/2012 | Torgerson ............... A01J 5/16 119/14.02 |
| 2014/0228776 A1* | 8/2014 | Winsor ............... A61M 39/24 604/247 |
| 2017/0014837 A1* | 1/2017 | Duke ............... B05B 1/3006 |
| 2017/0079234 A1* | 3/2017 | Torgerson ............... A01J 7/025 |

FOREIGN PATENT DOCUMENTS

| | | | | |
|---|---|---|---|---|
| EP | 0163483 A2 | * | 12/1985 | ............ A01J 5/041 |
| EP | 0522497 A1 | * | 1/1993 | ............ A01J 5/08 |
| EP | 1273224 A1 | * | 1/2003 | ............ A01J 5/007 |
| GB | 1451995 A | | 10/1976 | |
| NL | 7703220 A | | 9/1978 | |
| WO | WO-2001/017338 A1 | | 3/2001 | |
| WO | WO-0133947 A1 | * | 5/2001 | ............ A01J 5/00 |
| WO | WO-2005/043986 A1 | | 5/2005 | |
| WO | WO-2005/072516 A1 | | 8/2005 | |
| WO | WO-2005/102035 A2 | | 11/2005 | |
| WO | WO-2006/029797 A1 | | 3/2006 | |
| WO | WO-2007/031783 A1 | | 3/2007 | |
| WO | WO-2014193223 A1 | * | 12/2014 | ............ A01J 7/04 |
| WO | WO-2015/118336 A1 | | 8/2015 | |

OTHER PUBLICATIONS

Intellectual Property Office, Great Britain Search Report for Great Britain Application No. 1711385.3. dated Dec. 13, 2017, (8 pages), South Wales, United Kingdom.

International Searching Authority, International Search Report and Written Opinion for International Application No. PCT/GB2018/051949, dated Oct. 1, 2018, (14 pages), European Patent Office, Rijswijk, The Netherlands.

* cited by examiner

MILKING CLUSTER FOR MILKING AN ANIMAL

CROSS REFERENCE TO RELATED APPLICATIONS

This application is a National Stage Application, filed under 35 U.S.C. § 371, of International Application No. PCT/GB2018/051949, filed Jul. 10, 2018, which international application claims priority to and the benefit of United Kingdom Application No. 1711385.3, filed Jul. 14, 2017; the contents of both of which as are hereby incorporated by reference in their entirety.

BACKGROUND

Related Field

The present invention relates to a milking cluster for milking an animal, in particular a milking cluster comprising a plurality of teat cups connected to a clawpiece.

Description of Related Art

A known teat cup, such as that described in WO 2007/031783, comprises a shell and a liner inside of the shell. The liner comprises a head and a discharge passageway that is at opposite end of the liner from the head. The head is for receiving a teat of an animal, and the discharge passageway is for discharge of milk from the liner.

During a milking cycle, vacuum is transmitted from the clawbowl of the clawpiece to the discharge passageways of the liners, via short milk tubes. The vacuum draws milk along the short milk tubes from the discharge passageways to the clawbowl. The clawbowl is typically connected to a long milk tube for onward delivery of the milk. At a pre-set low milk flow from the animal, the milking cycle is considered to be complete, and then the supply of vacuum to the clawbowl is shut off, and treatment fluid is injected into the head of the liner via a nozzle in the head to disinfect the teat. The disinfecting of the teat by the treatment fluid is required to prevent the teat becoming infected and or condition the skin of the teat, for example treatment fluid with disinfecting properties may be used to help prevent mastitis infection. Teat conditioning agents such as emollients are sometimes also included within the treatment fluid.

One of the problems with injecting the treatment fluid into the liner is that some treatment flow may flow downwardly into the discharge passageway of the liner, either whilst the teat is still within the liner or after the teat has been withdrawn, potentially leading to contamination of the extracted milk.

Known milking equipment typically attempts to minimise or prevent treatment fluid from contaminating the extracted milk by carefully controlling the amount of treatment fluid that is delivered to the liner, washing the liner of the teat cup after withdrawal of the teat cup from the teat, and/or diverting any fluids that do enter the discharge passageway away from where the milk is stored. However, there is a desire for an improved method of preventing the potential of contaminating the extracted milk.

Another problem with known milking equipment is the stress that the vacuum places upon the animal's teat. During the milking cycle, differential pressure pulses are applied to a cavity between the shell and the liner, to massage the teat and aid extraction of the milk. The differential pressure pulses provide a milking phase in which the pressure in the cavity causes the liner to expand and milk to flow from the animal's teat, and a rest phase in which the pressure in the cavity causes the liner to collapse about the animal's teat and milk flow to substantially cease. The teats cups continuously alternate between the milking and rest phases during the milking cycle, each phase typically lasting for around one second. The teat cups are commonly operated out of phase from one another, such that whilst some of the teats cup(s) of the milking cluster are in the rest phase, the other teat cup(s) of the milking cluster are in the milking phase.

Typically, a high level of vacuum in the clawbowl is desirable to help transport of milk along the milk flow passageways during the milking phase of the teat cup. The high vacuum is to some extent modulated when the teat cup is in the milking phase, since the milk flowing out of the teat disrupts the vacuum and builds a pressure increase at the end of the teat. But, the high level of vacuum is undesirable during the rest phase of the teat cup since there is no milk flow to build a pressure increase and the high vacuum reaches the teat end causing unnecessary stress on the teat resulting in over compression by the liner on the teat risking poor blood circulation and edema.

BRIEF SUMMARY

It is therefore an aim of the invention to provide an improved milking cluster.

According to an aspect of the invention, there is provided a milking cluster comprising a plurality of teat cups connected to a clawpiece, each teat cup comprising a head, a discharge passageway for discharge of milk from the teat cup, and a barrel portion between the head and the discharge passageway, the head and barrel portion for receiving a teat of an animal to be milked. The clawpiece comprises a plurality of milk inlets that are connected to the plurality of teat cups via respective milk tubes, wherein the plurality of milk inlets discharge into a clawbowl of the clawpiece, wherein each discharge passageway, milk tube, and corresponding milk inlet collectively form a milk flow passageway beginning at the barrel of the teat cup and ending at the clawbowl. A valve system is present within each milk flow passageway, each valve system comprising a first pressure actuated valve which opens in response to a sufficient pressure difference across it, to allow milk to flow through the first pressure actuated valve and along the milk flow passageway.

The first pressure-actuated valve helps to regulate the vacuum that reaches the end of the teats. Since the first pressure-actuated valve requires greater than a threshold pressure difference across it to open, pressure fluctuations downstream of the valve system towards the clawbowl are decoupled from pressure fluctuations upstream of the valve system towards the teat, reducing stress on the teat. The pressure threshold difference may for example be at least 1 KPa, or at least 2 KPa.

The first pressure-actuated valve has an inlet in the milk flow passageway and an outlet in the milk flow passageway, and is configured to open when greater than the threshold pressure difference is applied across the inlet and the outlet, to allow flow of milk. In other words, the first pressure-actuated valve opens to allow milk flow along the milk flow passageway when the pressure difference across the valve along the milk flow passageway reaches a sufficiently high pressure difference. The inlet of the valve is upstream of the milk flow compared to the outlet of the valve, and the pressure at the inlet needs to be sufficiently higher than the pressure at the outlet for the valve to open.

Each valve system may further comprise a second pressure-actuated valve connected in series with the first pressure actuated valve, wherein the second pressure-actuated valve opens in response to a sufficient pressure difference across it, to allow milk to flow through the second pressure actuated valve and along the milk flow passageway. This further decouples pressure fluctuations downstream of the valve system towards the clawbowl from pressure fluctuations upstream of the valve system to the teat.

The second pressure-actuated valve has an inlet in the milk flow passageway and an outlet in the milk flow passageway, and is configured to open when greater than the threshold pressure difference is applied across the inlet and the outlet, to allow flow of milk. In other words, the second pressure-actuated valve opens to allow milk flow along the milk flow passageway when the pressure difference across the valve along the milk flow passageway reaches a sufficiently high pressure difference. The inlet of the valve is upstream of the milk flow compared to the outlet of the valve, and the pressure at the inlet needs to be sufficiently higher than the pressure at the outlet for the valve to open.

The teat cup preferably comprises a pulsation cavity between a shell of the teat cup and a liner of the teat cup, the liner forming the head, barrel, and discharge passageway of the teat cup, and the first and second pressure-actuated valves may be rated to open during a milking phase in which a first pressure is applied to the pulsation cavity to expand the liner and allow milk to flow from the teat of the animal, and the first and second pressure-actuated valves may be rated to close during a rest phase in which a second pressure higher than the first pressure is applied to the pulsation cavity to collapse the liner against the teat of the animal.

The pressure difference that is built up by the milk flow between the discharge end of each teat cup and the clawbowl when each teat cup is in the milking phase, causes the pressure actuated valves to open in the milking phase, allowing milk to flow along the milk flow passageways and into the clawbowl. When the teat cup moves to the rest phase, the milk flow drops, and the pressure difference reduces, causing the pressure actuated valves to close. When the pressure actuated valves close, they reduce the level of vacuum that reaches the teat in the rest phase, since they require a pressure difference across them to open. Accordingly, the level of vacuum reaching the teat in the rest phase is reduced, and less stress is placed on the teat. The rest phase is intended to give the teat a rest in between the milking phases, and limiting the vacuum that reaches the teats is also beneficial to help promote blood circulation through the teat.

When the first pressure actuated valve, and, if present, the second pressure actuated valve are opened, milk is able to flow through these open valve(s) on its way from the teat cup to the clawbowl. The milk flow is blocked if either or both the pressure actuated valves close. Since these valves typically open during the milking phase, the transfer of milk into the clawpiece is still sufficiently effective, despite the periodic closing of the valves.

Preferably, each teat cup further comprises a nozzle for injection of treatment fluid into the teat cup. Since the vacuum supply from the clawpiece is shut off at the end of the milking cycle and milk flow ceases, the first pressure actuated valve, and, if present, the second pressure actuated valve, close, and block any chance of the treatment fluid that is injected at the end of the milking cycle from travelling through the milk flow passageways.

Each valve system may further comprise both a flush inlet and a flush outlet to the milk flow passageway, the flush inlet and flush outlet located intermediate of the first and second pressure-actuated valves of the valve system. The flush inlet and the flush outlet can be used to flush the portion of the milk flow passageway between the two pressure-actuated valves, to ensure that any treatment fluid managing to pass through the first pressure actuated valve is flushed away prior to the next milking cycle when the cluster is applied to the next animal to be milked. Additionally, the flush outlet means that any treatment fluid managing to pass through the first pressure actuated valve will bleed away through the flush outlet instead of passing through the second pressure actuated valve.

Since the valve system is located upstream of the milk flow from the clawbowl, the clawbowl does not require any washing between milking different animals, greatly simplifying known milking systems. Typically, the teat cups are washed in an inverted position after they have been removed from the animal's teats so that the washing fluid can exit through the mouths of the teat cups. However, if for any reason one or more teat cups do not fall into an inverted position after removal from the teats and fill with washing fluid, then any washing fluid that manages to pass through the first pressure actuated valve will bleed away through the flush outlet instead of passing through the second pressure actuated valve to the clawbowl. Hence, any potential for milk contamination is prevented.

The first pressure actuated valve may be upstream of the milk flow from the second pressure actuated valve, and the first pressure actuated valve may be a bidirectional valve that opens to allow flow in whichever direction a sufficient pressure difference is created across the valve. The first pressure actuated valve may be rated to open at a lower pressure differential than the second pressure actuated valve. Then, if for any reason the flush outlet becomes blocked, the flushing fluid injected into the flush inlet will flow through the first pressure actuated valve towards the teat cup, where it can safely flow away out of the head of the teat cup when the teat cup is inverted, instead of flowing through the second pressure actuated valve and into the clawbowl towards the milk.

At least one of the first and second pressure actuated valves may be a non-return valve, to help prevent any upward fluctuations in the pressure in the clawbowl from reaching the teat cup, for example if the supply of vacuum to the clawbowl is disrupted for any reason such as another milking cluster which shares the same vacuum source accidentally falling off the teats of the animal.

The first and second pressure actuated valves may each require a pressure difference of at least 1 KPa across them to open, more preferably a pressure difference of at least 2 KPa across them to open. The higher the required pressure differential, the greater the reduction in the level of vacuum that reaches the animal's teats during the rest phase of the milking cycle, and the less likely that any washing fluid used to wash the teat cups after milking will find its way through the pressure actuated valves and towards the milk.

Each milk flow passageway may comprise an air inlet upstream of the milk flow from the first pressure actuated valve. The air inlet proves an air flow that helps transport the milk along the short milk tubes and into the clawbowl.

The first and second pressure actuated valves are preferably of a type requiring a higher pressure differential to initially open them than a pressure differential required to maintain them open. For example, a cross-slit valve such as commonly implemented in food sauce and sports drinks bottles requires a greater pressure to initially open the valve than the pressure required to maintain the valve open, and so fluid tends to flow quickly and easily through the valve once it is opened. Once the pressure actuated valves close in the rest phase of the teat cup, the air inlet upstream of the milk flow from the first pressure actuated valve will gradually allow the pressure in the discharge passageway to rise, and the increased pressure difference required for the pressure actuated valve to open again will help maintain the valve closed and keep the high vacuum in the clawbowl isolated from the end of the teat to reduce stress on the end of the teat.

The milking cluster may comprise a fluid distributor mounted on the clawpiece, with outlets for supplying flushing fluid to the flush inlets and/or treatment fluid to the nozzles. The fluid distributor distributes a single supply of the flushing fluid amongst the flush inlets, and a single supply of the treatment fluid amongst the nozzles. A cavity distributor may also be mounted on the clawpiece, which is configured to distribute air at the first and second pressures to the pulsation cavities of the teat cups via short air tubes connected between the cavity distributor and the teat cups.

The nozzle of each teat cup may be located in the head of the teat cup so the teat can be fully covered with the treatment fluid. Preferably, the nozzle is configured so that the primary direction of fluid flow from the nozzle can be in a direction into the barrel of the teat cup and towards the discharge passageway, so the nozzle can be used to flush the interior of the teat cup after the teat cup has been removed from the animal and hangs in an inverted position compared to its position during milking. Any increased risk of treatment fluid reaching the clawbowl when using a nozzle that directs fluid into the barrel of the teat cup towards the discharge passageway is mitigated by the valve system.

Each flush outlet may comprise a non-return valve that prevents ingress of fluid or dirt into the corresponding milk flow passageway via the flush outlet. The flush outlet is a drain which may allow the outlet flushing fluid to simply fall to the floor of the milking parlour. The non-return valve is preferably a pressure actuated valve of a type that requires very little pressure differential across it to open, for example the non-return valve may be a duck bill valve or more preferably an umbrella valve. As a minimum requirement, the pressure differential required to open the non-return valve of the flush outlet should be lower than the pressure differential required to open the first and second pressure actuated valves. Then, the flushing fluid will exit the portion of the milk flow passageway between the first and second pressure actuated valves via the non-return valve of the flush outlet, rather than via the first or second pressure actuated valves. An umbrella valve may guard against ingress of fluid or dirt more effectively than a duck bill valve.

The valve systems are preferably located inside the milk inlets of the clawpiece, however could alternatively located inside the discharge passageways of the teat cups or in the short milk tubes. The liners of the teat cups and the short milk tubes may be replaced more regularly that the clawpiece, and so it is more economic to make the valve systems within the clawpiece rather than in the teat cups or short milk tubes. The milk inlets of the clawpiece may be formed as spigots which fit into the ends of the short milk tubes.

The milking cluster may be implemented as part of milking equipment including stall control equipment, the stall control equipment configured to send treatment fluid to the nozzles of the teat cups via the fluid distributor, to treat the teats of the animal once the milking cycle has been completed, and subsequently send flushing fluid to the flush inlets via the fluid distributor once the treating of the teats of the animal with the treatment fluid has been completed. The stall control equipment may also be configured to send the air at the first and second pressures to the pulsation cavities via the cavity distributor to massage the teats during the milking cycle. Furthermore, the stall control equipment may be configured to send flushing fluid, and/or blasts of air through the nozzles, to effect cleaning of the at least one teat cups after they have been removed from the teats.

According to another aspect of the invention, there is provided a method of milking an animal using the milking cluster or the milking equipment, the method comprising applying the teat cups to teats of an animal and milking the animal during a milking cycle, the milking cycle comprising alternating between milking and rest phases for each teat cup, wherein the first pressure-actuated valve of each teat cup opens during the milking phase of the teat cup, and closes during the rest phase of the teat cup. The method may further comprise injecting treatment fluid into the teat cups to treat the teats of the animal once the milking cycle has been completed, and injecting flushing fluid into the flush inlets to flush the portion of the milk flow passageway between the first and second pressure-actuated valves once the treating of the teats of the animal with the treatment fluid has been completed.

BRIEF DESCRIPTION OF THE FIGURES

Embodiments of the invention will now be described by way of example only and with reference to the accompanying drawings, in which:

FIG. 1a shows a schematic diagram of milking equipment according to an embodiment of the present invention;

FIG. 1b shows a schematic exploded diagram of part of the milking equipment of FIG. 1a;

The drawings are not to scale. Same or similar reference signs denote same or similar features.

DETAILED DESCRIPTION OF VARIOUS EMBODIMENTS

Figures 1A, 1B:
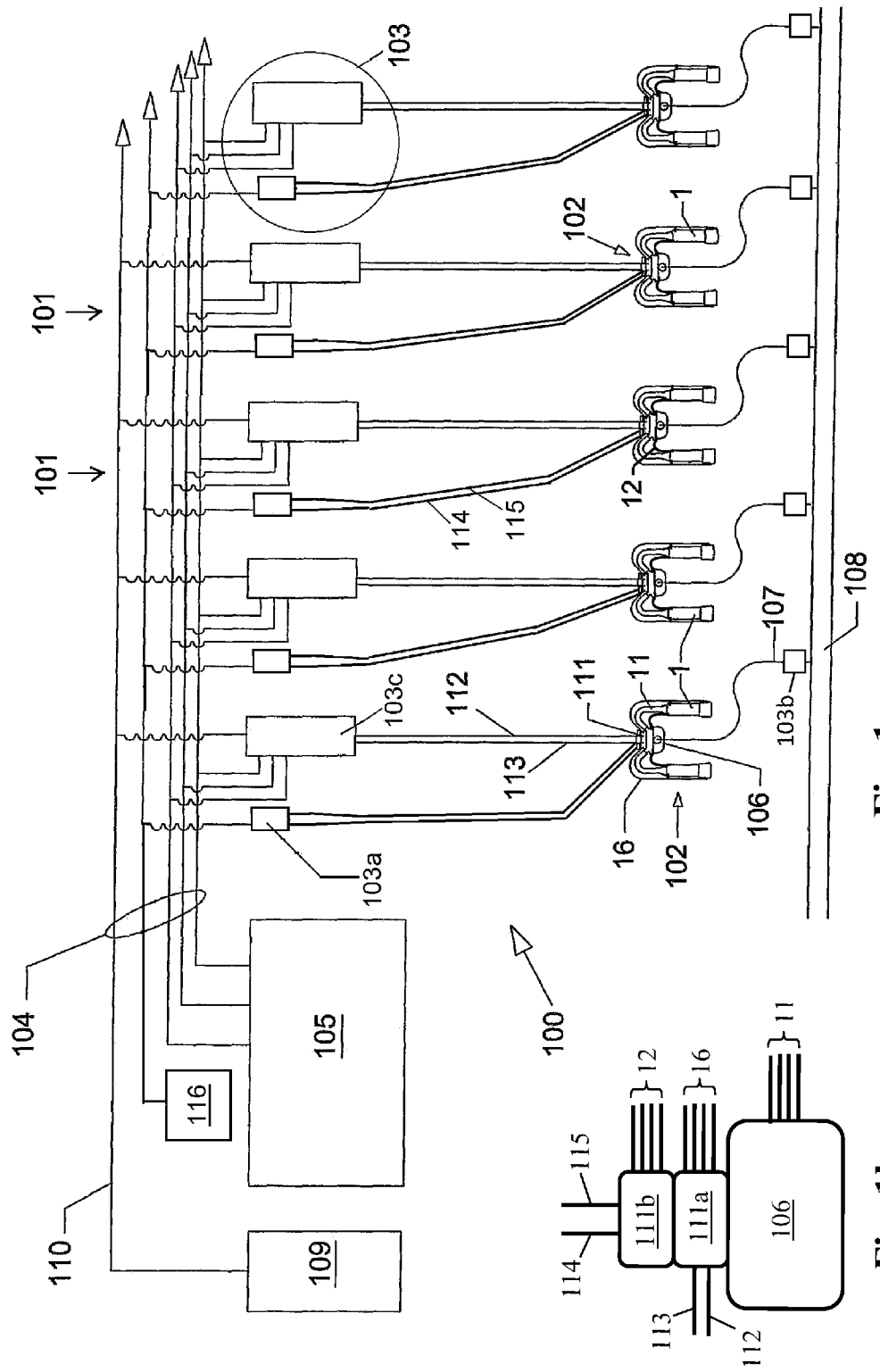

The schematic diagram of FIG. 1a shows milking equipment 100 installed in a milking parlour for cows. The part of the parlour shown in FIG. 1a comprises five animal stalls, for example for cows, in each of which there is a milking point 101 including a milking cluster 102 of four teat cups and stall control equipment 103.

Each stall control equipment comprises a pulsator 103a, a milk flow meter 103b, and a control mechanism 103c. Each pulsator 103a receives a vacuum from a common vacuum source 116, and outputs differential pressure pulses to pulse lines 114 and 115, towards the corresponding milking cluster 102.

Each control mechanism 103c has solenoid valves which selectively control the delivery of compressed air, treatment fluid, and flushing fluid to the milking cluster 102 from a manifold assembly 104 delivering these fluids to the individual milking points 101 from common sources of supply provided by a fluid control unit 105 connected to the manifold assembly. The compressed air is typically at least 200 KPa above atmospheric pressure.

Electrical power for the control mechanisms 103c is supplied by the common electrical control unit 109 via the cable 110. Each control mechanism 103c has at least two fluid delivery lines 112, 113 that are connected to an inlet of a distributor 111, the distributor 111 being mounted on a clawpiece 106 of each milking cluster 102. The delivery line 112 supplies treatment fluid, for example, disinfectant and emollient, for sanitising the teat of a cow, whilst the delivery line 113 supplies flushing fluid, water and high pressure compressed air.

The teat cups 1 of each milking cluster 102 are connected via flexible short milk tubes 11 to the clawpiece 106 of the cluster where the milk extracted from the animal's teats is collected and delivered by a flexible long milk tube 107 to a milk collection line 108 leading to a collection vessel of the equipment. Each flexible long milk tube 107 is connected to the milk collection line 108 via a milk flow meter 103b.

As shown in the exploded diagram of FIG. 1b, each distributor 111 includes a fluid distributor 111a and a cavity distributor 111b that are connected to one another on the clawpiece 106. The fluid distributor 111a receives the fluids from the delivery lines 112 and 113, and has four outlets that distribute the fluids to the four teat cups 1 of the cluster via flexible short fluid tubes 16.

The fluid distributor 111a also has four additional outlets that distribute fluid from the delivery line 113 to four flush inlets of the clawpiece 106 via four flush tubes. These four additional outlets, short flush tubes, and flush inlets are not shown in FIG. 1b for clarity, but are described in more detail with reference to FIGS. 3 and 4 further below. The four additional outlets, short flush tubes, and flush inlets may optionally receive fluid from an additional delivery line bundled with the delivery line 113 and connected to the fluid distributor 111a, rather than the delivery line 113 itself.

The teat cups 1 of each milking cluster 102 are also connected to outlets of the cavity distributor 111b via flexible short air tubes 12. The cavity distributor 111b receives differential pressure pulses from the pulse lines 114 and 115, and has four outlets that distribute the differential pressure pulses to the four teat cups 1 of the cluster via the flexible short air tubes 12. In this particular embodiment, the differential pressure pulses are alternating pulses of vacuum and atmospheric pressure. Each pulse cycle comprising vacuum followed by atmospheric pressure lasts for around 1 second.

When the teat cups of a cluster 102 have been fitted to a cow's udder and the milking equipment is being operated in a milking cycle, vacuum is applied to the milk collection line 108, and travels through the long milk tube 107 and the clawpiece 106 to each short milk tube 11 in order to extract, from the associated teat cup, milk discharged from the engaged teat. The differential pressure pulses are applied to the teat cups via the flexible short air tubes 12 to help stimulate release of milk from the cow's teats. The differential pressure pulses sent along the pulse line 114 are of first phase and the differential pressure pulses sent along the pulse line 115 are of a second phase that is opposite to the first phase. The cavity distributor 111b sends the first phase differential pressure pulses to two of the four flexible air tubes 12, and the second phase differential pressure pulses to the other of the two of the four flexible air tubes 12, in accordance with known practice in the art. Alternatively, the first and second phases may be the same phase as one another, so that only a single pulse line is required.

Once the milk flow meter 103b detects that the flow of milk has dropped, indicating that the udder has been substantially fully milked, the milking cycle is considered to have been completed and the milk flow meter 103b shuts off the supply of vacuum from the milk collection line 108 to the long milk tube 107. Then, the control mechanism 103c applies treatment fluid including disinfectant to the teat cups via the short fluid tubes 16.

Once the teat cups 1 have been withdrawn from the udder, they fall into the inverted position shown in FIG. 1a, and any excess treatment fluid drains from the teat cups out of the heads of the liners. The stall control equipment then applies flushing fluid to the flush inlets of the clawpiece via the short flush tubes, and to the teat cups via the short fluid tubes 16 to rinse the liners of the teat cups in preparation for the next animal to be milked.

The teat cups 1 will now be described in more detail with reference to FIG. 2, which shows a schematic sectional diagram of one of the teat cups 1, taken along the length of the teat cup 1. The teat cup 1 comprises a shell 200 and a flexible rubber liner 210 inside of the shell. In this embodiment the shell is formed of stainless steel, although other metals or non-metals such as plastics could alternatively be used. The liner has a head 212 that is shown with a cow's teat 300 inserted into the liner via the head 212, a discharge passageway 214 at an opposite end of the liner from the head 212, and a barrel 213a where the teat rests between the head 212 and the discharge passageway 214. The liner 210 terminates at connection 216 where one the short milk tubes 11 is connected, although the short milk tube could alternatively be formed integrally with the liner 210. The short milk tube 11 comprises an air bleed inlet 250 at an end of the short milk tube that is adjacent to the teat cup. During milking, air can enter the short milk tube 11 through the air bleed inlet 250 to help transport of milk along the short milk tube.

There is a cavity 205 which exists between the shell 200 and the liner 210, and a pipe 222 leads into the cavity 205 at a port 220. The pipe 222 has a nipple 225 for connecting one of the short air tubes 12. Since the liner is flexible, the liner 210 is able to flex towards and away from the shell 220 in response to the differential pressure pulses supplied to the cavity 205 via the port 220. The flexing of the liner 210 massages the teat 300 during milking to aid extraction of milk from the teat. The extracted milk flows downwardly out of the liner through the discharge passageway 214, and into one of the short milk tubes 11 via the connection 216.

The head 212 of the liner is fitted with a nozzle 230 for injecting treatment fluid such as disinfectant into the head of the liner, to disinfect the teat 300 once milking is complete. The nozzle 230 is downwardly directed so that it sprays treatment fluid in a direction into the barrel 213a, towards the discharge passageway 214. The nozzle 230 is connected to a pipe 232 which runs downwards alongside the shell 200 to a nipple 235. The nipple 235 is for connecting one of the short fluid tubes 16, for receiving the treatment fluid from the control mechanism 103c. The head 212 of the liner is shaped to form a cavity 213 between the head 212 and the cow's teat 300, providing space for treatment fluid injected into the head of the liner.

Figure 3:
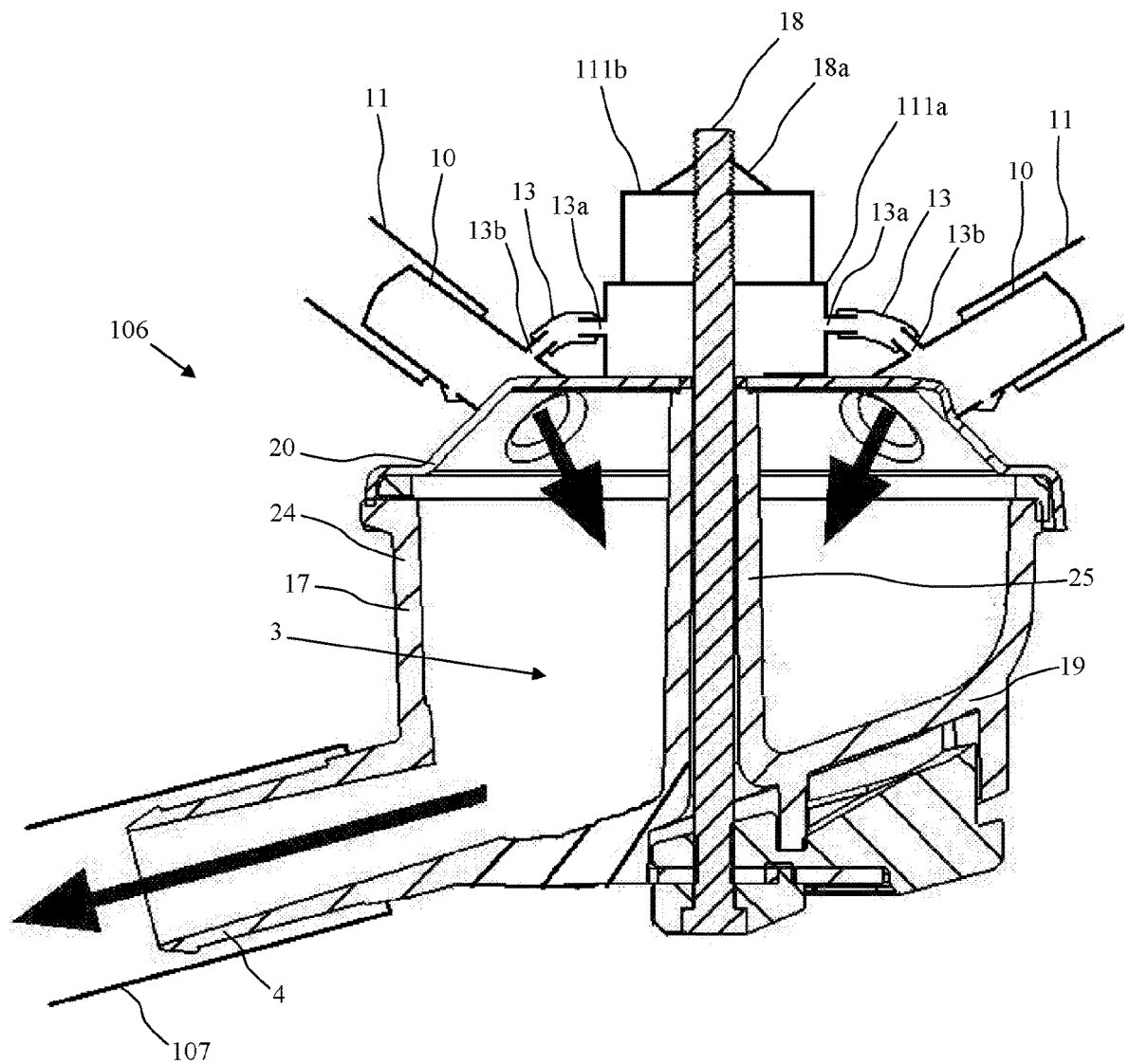
FIG. 3 shows a schematic cross-sectional diagram of a clawpiece forming part of the FIG. 1a embodiment.

The clawpiece 106 will now be described with reference to FIGS. 3 and 4. As shown in FIG. 3, the clawpiece 106 comprises a plastic base 24 having sidewalls 17 and a bottom 19, and a metal lid 20 having which is sealed over the tops of the sidewalls 17 of the base 24. Milk inlet nipples 10 are positioned in the lid 20 of the clawpiece, and are attached to the ends of the short milk tubes 11 from the teat cups.

A milk outlet nipple 4 is positioned in the sidewalls 17 near the bottom 19, and this is attached to the long milk tube 107 for onward delivery of milk. The bottom 19 of the clawbowl is slopped towards the milk outlet nipple 4 to help encourage all milk to drain out of the milk outlet nipple 4. The sidewalls 17, bottom 19, and metal lid 20 together define a clawbowl 3 which is a cavity where milk flows from the short milk tubes 11 enter via the milk inlet nipples 10, and are combined, and outlet to the long milk tube 107 via the milk outlet nipple 4.

A rod 18 for mounting the distributors 111a and 111b extends upwardly through the centre of the clawpiece 106, and is threaded at its upper end above the lid 20. The rod 18 passes through the distributors, and a nut 18a screwed onto the end of the rod 18 secures the distributors 111a and 111b to the clawpiece. The rod 18 extends through a tube 25 running right through the centre of the clawbowl 3.

As mentioned previously, the fluid distributor 111a has four additional outlets connected to four flush inlets via four short flush tubes, and two of these additional outlets 13a, short flush tubes 13, and corresponding flush inlets 13b are visible in FIG. 3. This arrangement will now be discussed in more detail with reference to FIG. 4, which shows an enlarged cross-sectional diagram through the one of the milk inlets 10.

Figure 4:
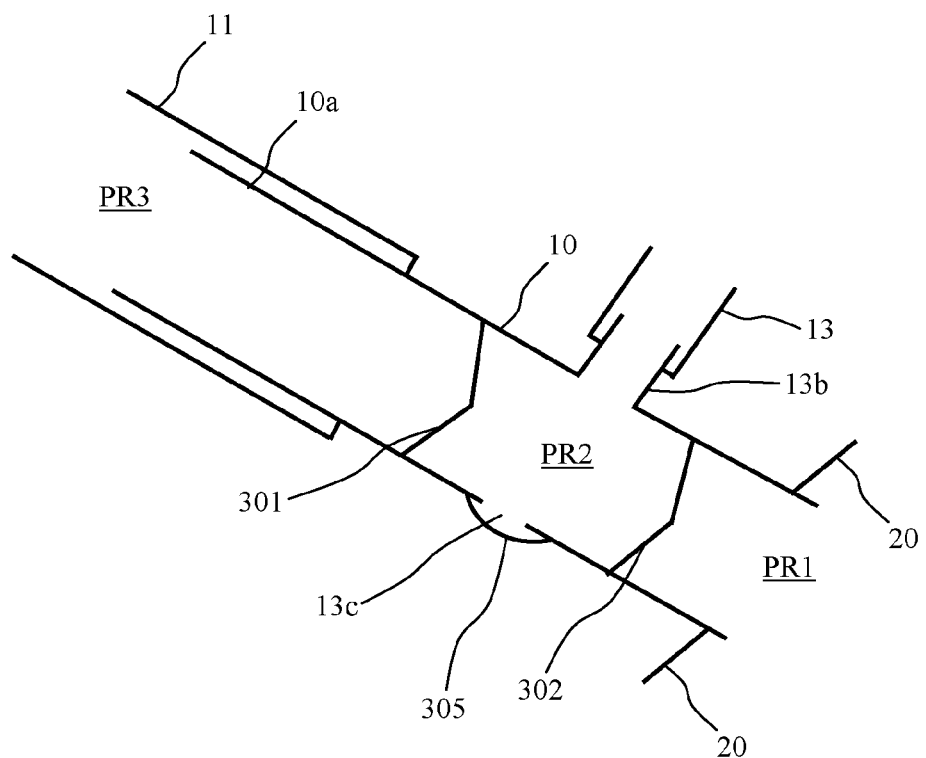
FIG. 4 shows a schematic cross-sectional diagram of a milk inlet of the clawpiece of FIG. 3.

FIG. 4 shows the milk inlet 10, which formed as a metal spigot protruding from the metal lid 20 of the clawpiece. The distal end 10a of the spigot is received in the end of the short milk tube 11 opposite from the associated teat cup. The spigot has first pressure actuated valve in the form of cross-split valve 301 and a second pressure actuated valve in the form of cross-split valve 302. The first and second pressure actuated valves 301 and 302 are connected in series with another, within a milk flow passageway from the barrel 213a of the teat cup 1 to the clawbowl 3 of the clawpiece 106. The first pressure actuated valve 301 will open when a sufficient pressure difference (pressure drop) is created from the pressure PR3 in the short milk tube at the inlet of the valve 301, to the pressure PR2 at the outlet of the valve 301 and the inlet of the valve 302, between the first and second pressure actuated valves 301 and 302. The pressure actuated valve 302 will open when a sufficient pressure difference (pressure drop) is created from the pressure PR2 at the inlet of the valve 302 to the pressure PR1 in the clawbowl at the outlet of the valve 302.

The spigot has the flush inlet 13b at an upper side of the spigot, between the short milk tube 11 and the metal lid 20, and intermediate of the first and second pressure actuated valves 301 and 302. The flush inlet 13b comprises a nipple which is received in the short flush tube 13, and which transmits flushing fluid from the short flush tube 13 into the milk inlet 10 between the first and second pressure actuated valves.

The spigot also has a flush outlet 305 at a lower side of the spigot, between the short milk tube 11 and the metal lid 20, and intermediate of the first and second pressure actuated valves 301 and 302. The flush outlet 305 is fitted with a non-return valve in the form of an umbrella valve 305 that allows fluid to flow out of the milk inlet 10, but not into the milk inlet 10. The first and second pressure actuated valves 301 and 302, and the flush inlet 13b and flush outlet 13c intermediate the valves 301 and 302, together provide a valve system. In an alternate embodiment, the valve system comprises the first pressure actuated valve 301, but not the second pressure actuated valve 302, and not the flush inlet 13b and flush outlet 13c.

Figure 5A:
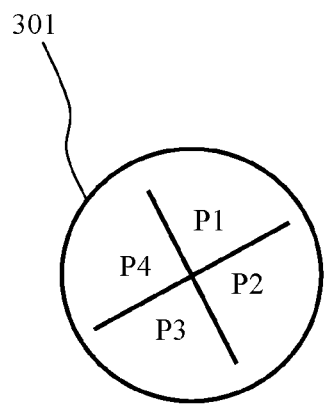
FIGS. 5a and 5b show schematic diagrams of a cross-slit valve used in the milk inlet of FIG. 4.
Figure 5B:
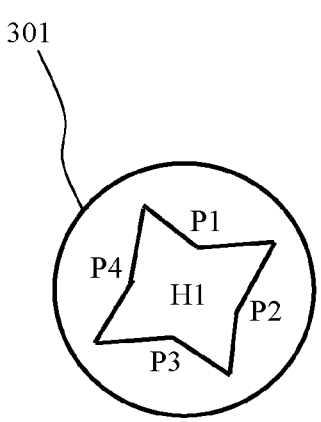

The schematic diagrams of FIGS. 5a and 5b show the first pressure actuated valve 301 in open and closed positions, respectively. The valve comprises a membrane with cross-slits, and the cross-slits define four petals P1, P2, P3, and P4. The membrane biases the petals in the closed position shown in FIG. 5a, but when a sufficient pressure difference exists the petals overcome the bias and open as shown in FIG. 5b. The opening of the petals creates a large flow passageway H1 for the milk to flow during milking, and once fluid flow starts the fluid flow helps to keep the petals open with limited pressure loss across the valve. Accordingly, the pressure difference required to initially open the valve is higher than the pressure difference required to maintain the valve in its open position.

The second pressure actuated valve 302 is substantially the same as the first pressure actuated valve 301, however the second pressure actuated valve 302 requires a higher pressure difference to open it than the first pressure actuated valve 301. Then, if the flush outlet 13c becomes blocked for any reason, fluid injected via the flush inlet 13b will flow out through the valve 301, rather than through the valve 302. In this particular embodiment, the valve 301 requires a pressure difference of 6 KPa to initially open, and 2 KPa to maintain it open, whereas the valve 302 requires a pressure difference of 9 KPa to initially open, and 3 KPa to maintain it open. In an embodiment where the second pressure actuated valve 302, the flush inlet 13b, and the flush outlet 13c are absent, the opening pressure of the first pressure actuated valve 301 may be adjusted to compensate for the lack of the second pressure actuated valve if desired.

Figure 6:
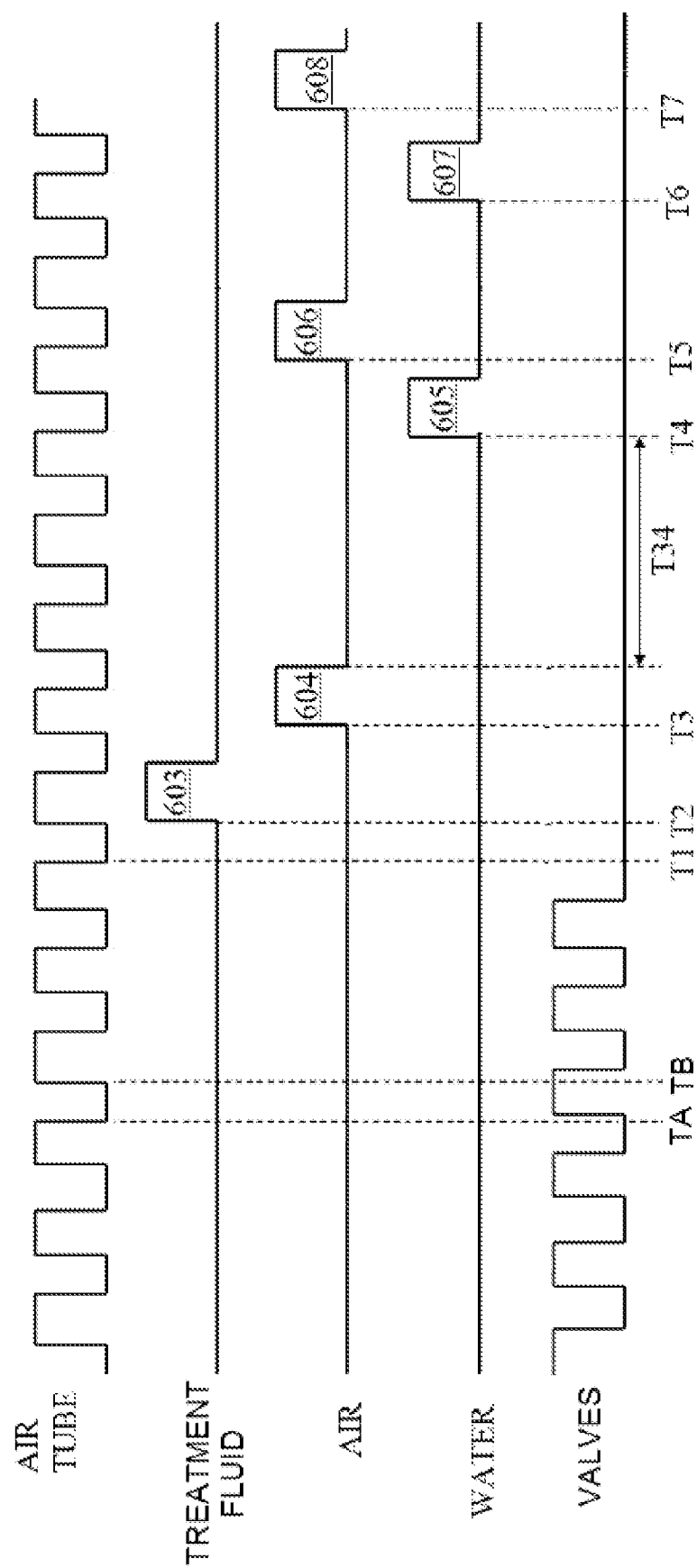
FIG. 6 shows a timing diagram of a method of milking.

This method of milking using the above-described milking equipment will now be described with reference to the timing diagram of FIG. 6. The timing diagram shows five different traces, the first trace showing the application of air pressure to the cavity 205 via the port 220, the second trace showing the application of treatment fluid to the head end 212 of the liner via the nozzle 230, the third trace showing the application of air to the head end 212 of the liner via the nozzle 230 and to the flush inlets 13b, the fourth trace showing the application of flushing fluid (water) to the head end 212 of the liner via the nozzle 230 and to the flush inlets 13b, and the fifth trace showing the states of the pressure actuated non-return valves 301 and 302. The high state of the fifth trace indicates both valves 301 and 302 are open, and the low state of the fifth trace indicates both valves 301 and 302 are closed.

Firstly, the milking cluster 102 is applied to the teats of an animal, including applying the teat cup 1 to the teat 300 of the animal. Then, to effect a milking cycle, a vacuum is supplied to the milk outlet nipple 4 via the milk collection line 108 and long milk tube 107, and the vacuum travels through the clawbowl 3 and the milk inlet 10, to the corresponding short milk tube 11 and teat cup 1. Differential pressure pulses shown in the first trace are applied into the cavity 205 via the port 220 to massage the teat 300 with the liner 210 and extract milk. The differential pressure pulses alternate between a low pressure (vacuum) and a higher pressure (typically atmospheric). The teat cup 1 repetitively alternates between milking and rest phases during the milking cycle, as explained below.

Figure 2:
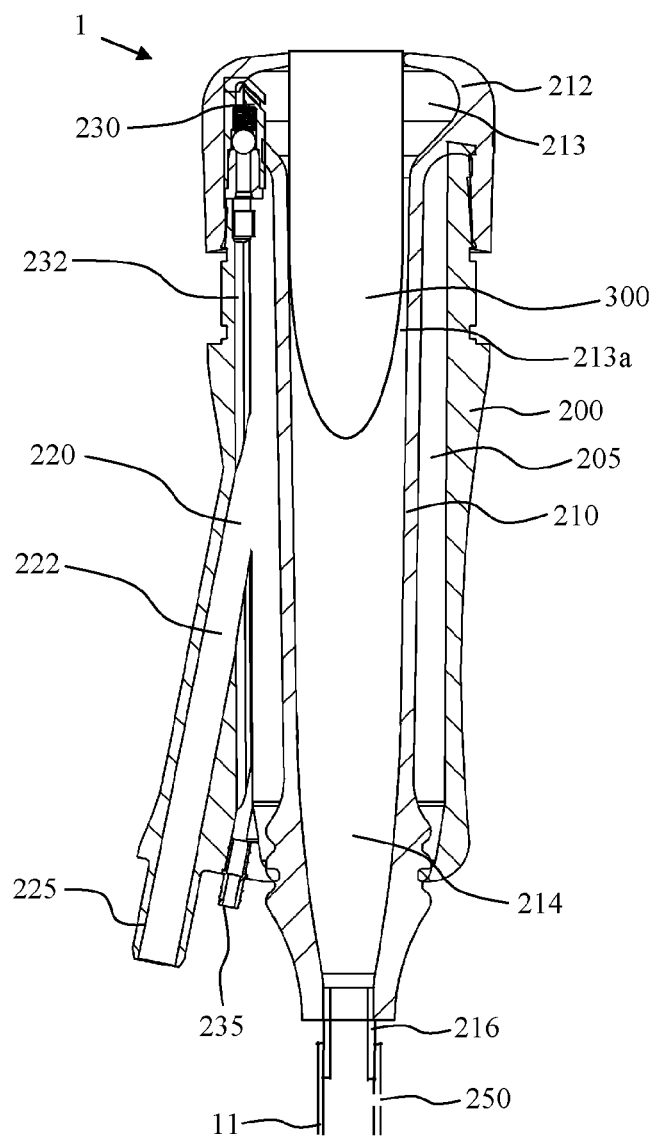
FIG. 2 shows a schematic cross-sectional diagram of a teat cup forming part of the FIG. 1a embodiment.

During a milking phase of the teat cup when the pressure applied to the cavity 205 via the line 114 or 115 is a low pressure at time TA, the liner 210 expands away from the teat 300 to the position shown in FIG. 2. Milk is drawn from the teat 300, and the pressure at the discharge end 214 of the teat cup and along the short milk tube 11 rises due to the milk flow. This pressure rise causes the pressure actuated valves 301 and 302 to open slightly after time TA, allowing the milk to be transported through the milk inlet 10, clawbowl 3, long milk tube 107, milk flow meter 103b, and into the milk collection line 108. A small quantity of air is inlet into the short milk tube 11 through the air bleed inlet 250, and this helps transport of milk along the short milk tube and along the delivery line 107, and also gives a small contribution to raising the pressure inside the short milk tube 11.

During a rest phase of the teat when the pressure applied to the cavity 205 via the line 114 or 115 is a higher pressure, beginning at time TB, the liner 210 collapses around the teat 300, giving the teat a rest from milking. The milk flow from the teat considerably drops or ceases, and so the pressure inside the short milk tube 11 falls towards the vacuum in the clawbowl. This drop in pressure causes the pressure actuated valves 301 and 302 to close shortly after time TB, and once closed, they remain closed even as the pressure inside the short milk tube 11 begins to rise again due to leakage of vacuum around the teat 300 and through the air bleed inlet 250. The 6 KPa opening pressure of the valve 301 and the 9 KPa opening pressure of the valve 302 means that the pressure in the short milk tube and the liner of the teat cup be up to 15 KPa higher than the pressure in the clawpiece before the valves 301 and 302 open, giving the teat 300 a beneficial rest from the vacuum in the clawbowl. Once the next milking phase starts and a low pressure is applied to the cavity 205 via the line 114 or 115, the liner 210 is expanded away from the teat 300 again, and milk beings to flow. The pressure in the short milk tubes rises sufficiently high for the valves 301 and 302 to open again.

The milking and rest phases are alternated between until the milk flow meter 103b detects the milk flow has dropped below a predetermined level at time T1, when the milking cycle is considered to be complete. The milk flow meter 103b shuts off the supply of vacuum to the long milk tube 107, allowing the pressure within the clawbowl 3 to rise towards atmospheric pressure, reducing the pressure across the valves 301 and 302 and causing them to close. Treatment fluid is sent to the fluid distributor 111a along delivery line 112, and is distributed into the heads of the liners via the short fluid tubes 16 and nozzles 230 at time T2. The treatment fluid sprays and pools within the cavity 213, and so the teat 300 is coated with the treatment fluid around the full circumference of the teat 300.

At time T3, a shot of air 604 is passed through the nozzle 230 to clear the pipe 232 of the treatment fluid and through the flush inlets 13b to clear the milk inlets 10 of the clawpiece of milk. The shot of air can help assist in withdrawing the teat 300 from the liner 210 since the pressure inside the cavity 213 is raised by the shot of air, expanding the head end 212 of the liner. Furthermore, the shot of air 604 impacts the treatment fluid 603 that is pooled within the cavity 213, agitating the treatment fluid to rise up the teat 300 and coat the upper regions of the teat.

Then, the milking cluster 102 is removed from the animal, and as the teat 300 is withdrawn from the liner 210 the treatment fluid sprayed or pooled in the cavity 213 coats the whole length of the teat 300 as the teat 300 is withdrawn through the cavity 213.

Once the milking cluster 102 has been withdrawn from the animal, the teat cups fall into the inverted position shown in FIG. 1a, and remain there during a period of time T34 which allows any treatment fluid still remaining in the liner to flow downwardly, out of the head end 212 of the liner 210.

At time T4, a burst of flushing fluid in the form of sanitised water 605 is sent to the fluid distributor 111a along the delivery line 113, and is distributed to the nozzles 230 via the short fluid tubes 16 to clean the teat cups, and to the flush inlets 13b via the short flush tubes 13 to flush the portion of the milk inlet 10 between the valves 301 and 302 of milk residues and any treatment fluid. The sanitised water may for example be tap water from a mains supply.

Optionally, there may be a separate delivery line bundled with the delivery line 113 to deliver the water to the distributor for the flush inlets 13b, with the water for the nozzles 230 still being sent along the delivery line 113. This, or an appropriate control system in the distributor if only delivery line 113 was used, would allow the nozzles 230 and the flush inlets 13b to inject the water at different times to one another. For example the water could be injected through the flush inlet 13b after the water was injected through the nozzle 230, so that any residue finding its way past the first pressure actuated valve 301 as a result of the water injected through the nozzle 230, would subsequently be flushed away by the water injected through the flush inlet 13b.

Since the nozzle 230 points towards the discharge passageway and the teat cup 1 is still inverted, the burst of water 605 injected via the nozzle 230 drains back down out of the head end of the liner under the influence of gravity. The burst of water 605 injected into the flush inlets 13b drains out of the flush outlets 13c, via the non-return valve 305. The valves 301 and 302 remain closed since there is no longer any significant vacuum in the clawbowl, and the pressure required to open them is higher than the pressure required to open the non-return valve 305.

The burst of water 605 is followed by another shot of air 606 through the nozzle 230 and the flush inlets 13b at time T5, which helps dry the liner and the milk inlets 10 of the clawpiece of the water 605.

Then, another burst of sanitised water 607 is injected into the liner via the nozzle 230 and into the flush inlets at time T6, to help clean away any treatment fluid that may still remain. The burst of water 607 is followed by another shot of air 608 through the nozzle 230 and the flush inlets at time T7, which helps dry the liner and the milk inlets of the clawpiece of the water 607. This can be repeated several times if desired, for example six times.

The milking cluster 102 is then ready to be applied to the next animal to be milked. In an alternate embodiment, the sanitised water 605 supplied at time T4 may be replaced with steriliser flushing fluid, to help sterilise the liner and the milk inlets of the clawpiece. The steriliser flushing fluid is subsequently washed away by the water flushing fluid 607 at time T6. Optionally, additional shots of water flushing fluid and air may be injected.

In an alternate embodiment where the valve system comprises the first pressure actuated valve 301, but not the second pressure actuated valve 302, and not the flush inlet 13b and flush outlet 13c, the method is the same except for that the water and air bursts 604, 605, 606, and 607 are only applied to the nozzle 230 and not the flush inlets 13b, which are absent. The valve 601 substantially follows the fifth trace of the timing diagram, and opens and closes during the milking and rest phases, to reduce stress on the teats.

Further embodiments falling within the scope of the appended claims will also be apparent to the skilled person.

The invention claimed is:

1. A milking cluster for milking an animal, the milking cluster comprising:
   a plurality of teat cups connected to a clawpiece, each teat cup comprising a head, a discharge passageway for discharge of milk from the teat cup, and a barrel portion between the head and the discharge passageway, the head and barrel portion for receiving a teat of an animal to be milked,
   wherein:

the clawpiece comprises a plurality of milk inlets that are connected to the plurality of teat cups via respective milk tubes, the plurality of milk inlets discharge into a clawbowl of the clawpiece, wherein each discharge passageway, milk tube, and corresponding milk inlet collectively form a milk flow passageway beginning at the barrel portion of the teat cup and ending at the clawbowl, a valve system is present within each milk flow passageway, each valve system comprises a first pressure-actuated valve which is configured to:

open in response to a first pressure difference greater than a first threshold across the first pressure-actuated valve in a first direction along the milk flow passageway, to allow milk to flow through the first pressure-actuated valve and along the milk flow passageway in the first direction, and open in response to a second pressure difference greater than a second threshold pressure difference being applied across the first pressure-actuated valve in a second direction along the milk flow passageway, to allow flushing fluid to flow through the first pressure-actuated valve and along the milk flow passageway in the second direction, the second direction being opposite the first direction.

2. The milking cluster of claim 1, wherein each teat cup further comprises a nozzle for injection of treatment fluid into the teat cup.

3. The milking cluster of claim 2, wherein:
the nozzle of each teat cup is located in the head of the teat cup, and
the nozzle is configured to inject the treatment fluid in a direction into the barrel portion of the teat cup and towards the discharge passageway.

4. The milking cluster of claim 1, wherein:
each teat cup comprises a pulsation cavity between a shell of the teat cup and a liner of the teat cup, the liner forming the head, the barrel portion, and the discharge passageway of the teat cup,
the first pressure-actuated valve is rated to open during a milking phase in which a first pressure is applied to the pulsation cavity to expand the liner and allow the milk to flow from the teat of the animal, and
the first pressure-actuated valve is rated to close during a rest phase in which a second pressure higher than the first pressure is applied to the pulsation cavity to collapse the liner against the teat of the animal.

5. The milking cluster of claim 1, wherein the first pressure-actuated valve is a cross-slit valve.

6. The milking cluster of claim 1, wherein the first pressure threshold is at least 1 KPa.

7. The milking cluster of claim 1, wherein each milk flow passageway further comprises an air inlet upstream of the milk flow from the first pressure-actuated valve.

8. The milking cluster of claim 1, wherein the first pressure-actuated valve requires a higher pressure differential to initially open it than a pressure differential required to maintain it open.

9. The milking cluster of claim 1, further comprising a fluid distributor mounted on the clawpiece.

10. The milking cluster of claim 2, further comprising a fluid distributor mounted on the clawpiece, wherein the fluid distributor comprises outlets that are connected to the nozzles of the teat cups via fluid tubes, for supplying treatment fluid to the teat cups.

11. The milking cluster of claim 1, wherein each valve system is located:
inside the corresponding milk inlet of the clawpiece,
inside the corresponding milk tube, or
inside the corresponding discharge passageway of the corresponding teat cup.

12. Milking equipment comprising:
the milking cluster of claim 1; and
stall control equipment configured to send treatment fluid to the nozzles of the teat cups to treat the teats of the animal once a milking cycle has been completed, and subsequently send the flushing fluid to the flush inlets once the treating of the teats of the animal with the treatment fluid has been completed.

13. The milking equipment of claim 12, wherein:
the stall control equipment comprises a milk flow meter that is connected to the clawbowl via a further milk tube, and
the milk flow meter is configured to shut off a vacuum to the further milk tube when a flow of milk falls below a threshold value.

14. A method of milking an animal using the milking cluster of claim 1, the method comprising applying the teat cups to teats of an animal and milking the animal during a milking cycle, the milking cycle comprising alternating between milking and rest phases for each teat cup, wherein the first pressure-actuated valve of each teat cup opens during the milking phase of the teat cup, and closes during the rest phase of the teat cup.

15. The milking cluster of claim 1, wherein the first threshold is at least 2 KPa.

16. A milking cluster for milking an animal, the milking cluster comprising:
a plurality of teat cups connected to a clawpiece, each teat cup comprising a head, a discharge passageway for discharge of milk from the teat cup, and a barrel portion between the head and the discharge passageway, the head and barrel portion for receiving a teat of an animal to be milked, wherein the clawpiece comprises a plurality of milk inlets that are connected to the plurality of teat cups via respective milk tubes,
wherein:
the plurality of milk inlets discharge into a clawbowl of the clawpiece,
each discharge passageway, milk tube, and corresponding milk inlet collectively form a milk flow passageway beginning at the barrel portion of the teat cup and ending at the clawbowl,
a valve system is present within each milk flow passageway, each valve system comprising a first pressure-actuated valve which is configured to open in response to a pressure difference greater than a first threshold being applied across the first pressure-actuated valve in a first direction along the milk flow passageway, to allow milk to flow through the first pressure-actuated valve and along the milk flow passageway in the first direction,
each valve system further comprises a second pressure-actuated valve connected in series with the first pressure-actuated valve,
the second pressure-actuated valve is configured to open in response to a pressure difference greater than a second threshold being applied across the second pressure-actuated valve in the first direction along the milk flow passageway, to allow the milk to flow through the second pressure-actuated valve and along the milk flow passageway in the first direction, and the first pressure-actuated valve is rated to open at a lower pressure differential than the second-pressure actuated valve, the second pressure actuated valve being downstream of the milk flow from the first pressure-actuated valve.

17. The milking cluster of claim 16, wherein each valve system further comprises both a flush inlet and a flush outlet to the milk flow passageway, the flush inlet and flush outlet located intermediate of the first and second pressure-actuated valves of the valve system, the flush inlet and flush outlet for flushing a portion of the milk flow passageway that is between the first and second pressure-actuated valves.

18. The milking cluster of claim 17, wherein:

each flush outlet comprises a non-return valve that prevents ingress of fluid or dirt into the corresponding milk flow passageway via the flush outlet, and the non-return valve of the flush outlet is optionally either a duck bill valve or an umbrella valve.

19. The milking cluster of claim 16, wherein:

each teat cup comprises a pulsation cavity between a shell of the teat cup and a liner of the teat cup, the liner forming the head, the barrel portion, and the discharge passageway of the teat cup, the first pressure-actuated valve is rated to open during a milking phase in which a first pressure is applied to the pulsation cavity to expand the liner and allow the milk to flow from the teat of the animal, the first pressure-actuated valve is rated to close during a rest phase in which a second pressure higher than the first pressure is applied to the pulsation cavity to collapse the liner against the teat of the animal, and the second pressure-actuated valve is rated to open during the milking phase and close during the rest phase.

20. The milking cluster of claim 17, further comprising a fluid distributor mounted on the clawpiece, wherein the fluid distributor comprises outlets that are connected to the flush inlets via flush tubes, for supplying flushing fluid to the flush inlets once a milking cycle has completed.

21. A method of milking an animal using the milking cluster of claim 16, the method comprising applying the teat cups to teats of an animal, milking the animal during a milking cycle, injecting treatment fluid into the teat cups to treat the teats of the animal once the milking cycle has been completed, and injecting flushing fluid into the flush inlets to flush the portion of the milk flow passageway between the first and second pressure-actuated valves once the treating of the teats of the animal with the treatment fluid has been completed.

* * * * *